US011299615B2

(12) United States Patent
Choi et al.

(10) Patent No.: US 11,299,615 B2
(45) Date of Patent: Apr. 12, 2022

(54) THERMOPLASTIC RESIN COMPOSITION

(71) Applicant: LG CHEM, LTD., Seoul (KR)

(72) Inventors: Jeong Su Choi, Daejeon (KR); Keun Hoon Yoo, Daejeon (KR); Won Seok Lee, Daejeon (KR); Roo Da Lee, Daejeon (KR); Jong Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 49 days.

(21) Appl. No.: 17/047,374

(22) PCT Filed: Sep. 5, 2019

(86) PCT No.: PCT/KR2019/011449
§ 371 (c)(1),
(2) Date: Oct. 13, 2020

(87) PCT Pub. No.: WO2020/050639
PCT Pub. Date: Mar. 12, 2020

(65) Prior Publication Data
US 2021/0115242 A1 Apr. 22, 2021

(30) Foreign Application Priority Data

Sep. 5, 2018 (KR) .................. 10-2018-0106052
Sep. 3, 2019 (KR) .................. 10-2019-0108784

(51) Int. Cl.
*C08L 51/04* (2006.01)
*C08L 25/14* (2006.01)
*C08L 33/08* (2006.01)

(52) U.S. Cl.
CPC .............. *C08L 51/04* (2013.01); *C08L 25/14* (2013.01); *C08L 33/08* (2013.01); *C08L 2205/035* (2013.01)

(58) Field of Classification Search
CPC .......... C08L 33/12; C08L 51/04; C08L 67/02; C08L 2205/035; C08L 2205/22; C08L 55/02
See application file for complete search history.

(56) References Cited

U.S. PATENT DOCUMENTS

| | | | |
|---|---|---|---|
| 4,767,833 A | 8/1988 | Yumoto et al. | |
| 6,323,279 B1 | 11/2001 | Guntherberg et al. | |
| 2009/0110943 A1 | 4/2009 | Nishimoto et al. | |
| 2011/0097561 A1* | 4/2011 | Kang | C08J 5/18 428/212 |
| 2013/0055683 A1 | 3/2013 | Daute et al. | |
| 2014/0191453 A1 | 7/2014 | Naiki et al. | |
| 2017/0349740 A1 | 12/2017 | Nishino et al. | |
| 2018/0022891 A1 | 1/2018 | Pfeiffer et al. | |
| 2018/0230301 A1 | 8/2018 | Choi et al. | |
| 2018/0273749 A1 | 9/2018 | Shindo et al. | |

FOREIGN PATENT DOCUMENTS

| | | |
|---|---|---|
| CN | 108137853 A | 6/2018 |
| EP | 0703252 A | 3/1996 |
| EP | 1548061 A | 6/2005 |
| EP | 3385327 A1 | 10/2018 |
| JP | H08-199008 A | 8/1996 |
| JP | H08-259909 A | 10/1996 |
| JP | H11-147020 A | 6/1999 |
| JP | 2000-198902 A | 7/2000 |
| JP | 2002-510349 A | 4/2002 |
| JP | 2005-023091 A | 1/2005 |
| JP | 2008-169239 A | 7/2008 |
| JP | 2010-070646 A | 4/2010 |
| JP | 2011-521068 A | 7/2011 |
| JP | 2013-518947 A | 5/2013 |
| JP | 2013-173867 A | 9/2013 |
| JP | 2015-132661 A | 7/2015 |
| KR | 10-2002-0064190 A | 8/2002 |
| KR | 10-2002-0091518 A | 12/2002 |
| KR | 10-2009-0067621 A | 6/2009 |
| KR | 10-2010-0045830 A | 5/2010 |
| KR | 10-1115217 B1 | 2/2012 |
| KR | 10-1352739 B1 | 1/2014 |
| KR | 10-2017-0025900 A | 3/2017 |
| WO | WO2011045991 A1 | 4/2011 |
| WO | WO2016098885 A1 | 6/2016 |
| WO | WO2017061472 A1 | 4/2017 |

OTHER PUBLICATIONS

Extended European Search Report for EP Application No. 19856706.7, dated Sep. 20, 2021.

* cited by examiner

*Primary Examiner* — Mark S Kaucher

(57) ABSTRACT

The present invention provides a thermoplastic resin composition which includes: A-1) a first copolymer including a first conjugated diene-based polymer, an alkyl (meth)acrylate-based monomer unit, and an aromatic vinyl-based monomer unit, wherein the first conjugated diene-based polymer has an average particle diameter of 0.05 to 0.2 μm; A-2) a second copolymer including a second conjugated diene-based polymer, an alkyl (meth)acrylate-based monomer unit, and an aromatic vinyl-based monomer unit, wherein the second conjugated diene-based polymer has an average particle diameter of 0.23 to 0.5 μm; B) a third copolymer including an alkyl (meth)acrylate-based monomer unit and an aromatic vinyl-based monomer unit; and C) a plasticizer having a viscosity of 700 to 10,000 cP, wherein the plasticizer is included at 0.3 to 5 wt %. The thermoplastic resin composition is excellent in all of transparency, impact resistance, and flowability.

14 Claims, No Drawings

THERMOPLASTIC RESIN COMPOSITION

CROSS-REFERENCE TO RELATED APPLICATION

This application is a National Phase of International Application No. PCT/KR2019/011449, filed on Sep. 5, 2019, which claims priority to and the benefit of Korean Patent Application No. 10-2018-0106052, filed on Sep. 5, 2018, and Korean Patent Application No. 10-2019-0108784, filed on Sep. 3, 2019, the disclosures of which are incorporated herein by reference in their entirety.

TECHNICAL FIELD

The present invention relates to a thermoplastic resin composition, and more particularly, to a thermoplastic resin composition having significantly improved transparency while maintaining basic properties.

BACKGROUND ART

As industry has been advanced and life has been diversified in recent years, many studies have been conducted to impart high functionality such as transparency and the like to materials in order to differentiate product models. For example, a study has been intensively conducted to further impart transparency to materials of products such as a washing machine cover enabling viewing of laundry contents, a cleaner dust collector enabling a visual determination of how much dust has collected, a toy, game console housing, a transparent window of home appliances, a transparent window of office machines, and the like.

An ABS graft copolymer that has been used in parts of the above-mentioned products is excellent in impact resistance, chemical resistance, processability, surface glossiness, and the like, but it cannot be applicable to materials that require transparency due to its opaqueness.

Examples of a commonly used transparent material include polycarbonate (PC), poly(methyl methacrylate) (PMMA), polystyrene (PS), polyacrylonitrile-styrene (SAN), and the like. The PC resin has excellent impact strength and excellent transparency, but it is difficult to make complicated products using the PC resin due to its poor processability. PMMA has excellent transparency but very poor impact resistance and very poor chemical resistance. In addition, PS and SAN have very poor impact resistance and very poor chemical resistance.

Meanwhile, U.S. Pat. No. 4,767,833, Japanese Unexamined Patent Application, First Publication No. H11-147020, EP Patent No. 703,252, and Japanese Unexamined Patent Application, First Publication No. H8-199008 disclose a method of introducing an alkyl (meth)acrylate-based monomer into an acrylonitrile-butadiene-styrene-based graft copolymer excellent in impact resistance, chemical resistance, processability, and the like to impart transparency. However, since there is a limitation in transparency, most products have a haze value of more than 2.0, and therefore, the application of this method to products using PMMA, PC, SAN, and the like, thick injection-molded products, or products that require high transparency is limited.

Therefore, it is required to develop a product having excellent impact resistance and excellent flowability while maintaining transparency at the level of products using PC, PMMA, SAN, and the like by further improving transparency.

DISCLOSURE

Technical Problem

The present invention is directed to providing a thermoplastic resin composition having significantly improved transparency while maintaining basic properties such as impact resistance, flowability, and the like.

Technical Solution

One aspect of the present invention provides a thermoplastic resin composition which includes: A-1) a first copolymer including a first conjugated diene-based polymer, an alkyl (meth)acrylate-based monomer unit, and an aromatic vinyl-based monomer unit, wherein the first conjugated diene-based polymer has an average particle diameter of 0.05 to 0.2 µm; A-2) a second copolymer including a second conjugated diene-based polymer, an alkyl (meth)acrylate-based monomer unit, and an aromatic vinyl-based monomer unit, wherein the second conjugated diene-based polymer has an average particle diameter of 0.23 to 0.5 µm; B) a third copolymer including an alkyl (meth)acrylate-based monomer unit and an aromatic vinyl-based monomer unit; and C) a plasticizer having a viscosity of 700 to 10,000 cP, wherein the plasticizer is included at 0.3 to 5 wt %.

Another aspect of the present invention provides a thermoplastic resin molded article made of the above-described thermoplastic resin composition and comprising an impact modifying part and a matrix part, wherein the impact modifying part includes one or more selected from the group consisting of a first conjugated diene-based polymer and a second conjugated diene-based polymer, the matrix part includes an alkyl (meth)acrylate-based monomer unit and an aromatic vinyl-based monomer unit, and the refractive index of the impact modifying part and the refractive index of the matrix part differ by 0.01 or less.

Advantageous Effects

A thermoplastic resin composition according to the present invention can have not only excellent basic properties such as impact resistance, flowability, and the like but also significantly improved transparency.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the refractive index refers to the absolute refractive index of a material and is recognized as the ratio of the speed of electromagnetic radiation in free space to the speed of the radiation in the material, wherein the radiation is the visible light having a wavelength of 450 nm to 680 nm. The refractive index may be measured using a known method, i.e., generally by using an Abbe refractometer.

In addition, the refractive index of a graft copolymer may be calculated by the following formula using the refractive index and content ratio of each polymer constituting the graft copolymer:

Refractive index(RI)={[Amount(wt %) of alkyl (meth)acrylate-based monomer unit]×[Refractive index of alkyl(meth)acrylate-based homopolymer]}+{[Amount(wt %) of aromatic vinyl-based monomer unit]×[Refractive index of aromatic vinyl-based homopolymer]}+{[Amount(wt %) of vinyl cyan-based monomer unit]×[Refractive index of vinyl cyan-based homopolymer]}

In the present invention, the average particle diameter of first and second conjugated diene-based polymers may be measured by a dynamic light scattering method, specifically, by using a Nicomp 380 instrument (manufactured by PSS Nicomp).

In the specification, the average particle diameter may refer to an arithmetic average particle diameter in the particle size distribution as measured by a dynamic light scattering method, that is, an average particle diameter in a scattering intensity distribution.

In the present invention, the viscosity of a plasticizer may be measured using a Brookfield viscometer under the following conditions.

Spindle type: cone type (CPA-52Z), Cone angle=3°, Cone radius=1.2 cm, Gap: 13 µm or less, Measurement shear rate: 10~20/sec, and Measurement temperature: 25° C.

In the present invention, the degree of grafting may be measured by the following equation after 1 g of first copolymer powder, second copolymer powder, or a thermoplastic resin composition is dissolved in 50 g of acetone while stirring for 24 hours and then centrifuged in a centrifuge (Supra 30K manufactured by Hanil Science Industrial) at 16,000 rpm and −10° C. for 4 hours to separate a supernatant and a precipitate, and the precipitate is dried in a hot air dryer set at 50° C. for 12 hours, and then the obtained dry solid is weighted:

Degree of grafting (%)={[(Weight of dry solid)−(Weight of conjugated diene-based polymer)]/(Weight of conjugated diene-based polymer)}×100

Weight of conjugated diene-based polymer=Weight of solid of first and second conjugated diene-based polymers added in the preparation of a first copolymer, a second copolymer, or a thermoplastic resin composition; or Weight of solids of first and second conjugated diene-based polymers as measured by analyzing a first copolymer, a second copolymer, or a thermoplastic resin composition through infrared spectroscopy In the present invention, the weight-average molecular weight of shells of first and second copolymers may refer to a weight-average molecular weight of a copolymer including an alkyl (meth)acrylate-based monomer unit, an aromatic vinyl-based monomer unit, and a vinyl cyan-based monomer unit which are grafted onto a conjugated diene-based polymer.

In the present invention, the weight-average molecular weight of shells of first and second copolymers may be measured as a relative value with respect to a standard polystyrene (PS) sample by gel permeation chromatography (GPC) after the dry solid mentioned in the measurement method of a degree of grafting is dissolved in a tetrahydrofuran (THF) solution at a concentration of 1 wt % and then filtered through a 1-µm filter.

In the present invention, the weight-average molecular weight of a third copolymer may be measured as a relative value with respect to a standard PS sample by GPC (Waters Breeze) using THF as an eluate.

In the present invention, the transparency may be measured in accordance with ASTM 1003.

In the present invention, the impact strength may be measured in accordance with ASTM D256 under a condition of ¼ inch.

In the present invention, the melt flow index may be measured in accordance with ASTM D1238 at 220° C. and 10 kg.

1. Thermoplastic Resin Composition

A thermoplastic resin composition according to an embodiment of the present invention includes: A-1) a first copolymer including a first conjugated diene-based polymer, an alkyl (meth)acrylate-based monomer unit, and an aromatic vinyl-based monomer unit, wherein the first conjugated diene-based polymer has an average particle diameter of 0.05 to 0.2 µm; A-2) a second copolymer including a second conjugated diene-based polymer, a an alkyl (meth)acrylate-based monomer unit, and an aromatic vinyl-based monomer unit, wherein the second conjugated diene-based polymer has an average particle diameter of 0.23 to 0.5 µm; B) a third copolymer including an alkyl (meth)acrylate-based monomer unit and an aromatic vinyl-based monomer unit; and C) a plasticizer having a viscosity of 700 to 10,000 cP, wherein the plasticizer is included at 0.3 to 5 wt %.

Hereinafter, each component of the thermoplastic resin composition according to an embodiment of the present invention will be described in detail.

A-1) First Copolymer

The first copolymer is a graft copolymer and includes a first conjugated diene-based polymer, an alkyl (meth)acrylate-based monomer unit, and an aromatic vinyl-based monomer unit.

The first copolymer may work synergistically with a second copolymer to impart excellent transparency and excellent impact resistance, particularly, significantly excellent transparency to the thermoplastic resin composition.

The first conjugated diene-based polymer may have an average particle diameter of 0.05 to 0.2 µm, preferably, 0.07 to 0.18 µm. Below the above-described range, excellent impact resistance may not be realized, and above the above-described range, excellent transparency may not be realized.

The first conjugated diene-based polymer is prepared by polymerizing conjugated diene-based monomers or by polymerizing a conjugated diene-based monomer and a comonomer copolymerizable with the conjugated diene-based monomer and may have a structure in which a double bond and a single bond are alternatively arranged.

The first conjugated diene-based polymer may include a modified conjugated diene-based polymer prepared by graft polymerization of a conjugated diene-based polymer with an alkyl (meth)acrylate-based monomer and an aromatic vinyl-based monomer.

The conjugated diene-based monomer may be one or more selected from the group consisting of 1,3-butadiene, isoprene, chloroprene, piperylene, dicyclopentadiene, ethylidene norbornene, and vinyl norbornene, with 1,3-butadiene or ethylidene norbornene being preferred.

The comonomer copolymerizable with the conjugated diene-based monomer may be one or more selected from the group consisting of acrylonitrile, ethylene, and propylene.

The first conjugated diene-based polymer may be one or more selected from the group consisting of polybutadiene; a copolymer including a unit derived from 1,3-butadiene and a unit derived from acrylonitrile; and a copolymer including a unit derived from ethylidene norbornene, a unit derived from ethylene, and a unit derived from propylene, with polybutadiene being preferred.

The first conjugated diene-based polymer may be included at 35 to 65 wt % or 40 to 60 wt % with respect to the total weight of the first copolymer, with the range of 40 to 60 wt % being preferred. When the above-described range is satisfied, the transparency and impact resistance of the first copolymer can be improved.

The alkyl (meth)acrylate-based monomer unit may impart excellent transparency to the first copolymer.

The alkyl (meth)acrylate-based monomer unit may be a unit derived from one or more selected from the group consisting of methyl (meth)acrylate, ethyl (meth)acrylate, propyl (meth)acrylate, 2-ethylhexyl (meth)acrylate, decyl (meth)acrylate, and lauryl (meth)acrylate, with the unit derived from methyl (meth)acrylate being preferred.

The alkyl (meth)acrylate-based monomer unit may be included at 20 to 50 wt % or 25 to 45 wt % with respect to the total weight of the first copolymer, with the range of 25 to 45 wt % being preferred. When the above-described range is satisfied, the transparency of the first copolymer can be improved.

The aromatic vinyl-based monomer unit may impart processability, stiffness, and mechanical properties to the first copolymer.

The aromatic vinyl-based monomer unit may be a unit derived from one or more selected from the group consisting of styrene, α-methylstyrene, α-ethylstyrene, and p-methylstyrene, with the unit derived from styrene being preferred.

The aromatic vinyl-based monomer unit may be included at 7 to 30 wt % or 10 to 25 wt % with respect to the total weight of the first copolymer, with the range of 10 to 25 wt % being preferred. When the above-described range is satisfied, the processability, stiffness, and mechanical properties of the first copolymer can be improved.

The first copolymer may further include a vinyl cyan-based monomer unit to improve chemical resistance.

The vinyl cyan-based monomer unit may be a unit derived from one or more selected from the group consisting of acrylonitrile, methacrylonitrile, phenylacrylonitrile, and α-chloroacrylonitrile, with the unit derived from acrylonitrile being preferred.

The vinyl cyan-based monomer unit may be included at 0.5 to 10 wt % or 1 to 7 wt % with respect to the total weight of the first copolymer, with the range of 1 to 7 wt % being preferred. When the above-described range is satisfied, the chemical resistance of the first copolymer can be improved without the occurrence of a yellowing phenomenon. In addition, the formation of a coagulum is suppressed during the polymerization of the first copolymer, and thus polymerization stability can increase.

The first copolymer may have a degree of grafting of 40 to 80%, more preferably 45 to 70%, and most preferably 50 to 60%. When the above-described range is satisfied, the transparency of the thermoplastic resin composition can be improved. When a degree of grafting for the first copolymer is less than the above-described range, even though the refractive indices of the first to third copolymers are consistent, the transparency of the thermoplastic resin composition may be degraded. On the other hand, when a degree of grafting for the first copolymer is more than the above-described range, impact strength may be degraded.

Meanwhile, the transparency of the first copolymer may be determined by a difference in the refractive index between the first conjugated diene-based polymer and a shell including the alkyl (meth)acrylate-based monomer unit and the aromatic vinyl-based monomer unit. That is, in order for the first copolymer to have excellent transparency, the refractive index of the first conjugated diene-based polymer and the refractive index of the shell may differ by 0.01 or less, and no difference in the refractive index therebetween is preferred.

In addition, in order for the thermoplastic resin composition to realize excellent transparency, the refractive indices of the first to third copolymers may differ by 0.01 or less. Specifically, the refractive index of the first copolymer and the refractive index of the second copolymer may differ by 0.01 or less, the refractive index of the first copolymer and the refractive index of the third copolymer may differ by 0.01 or less, and the refractive index of the second copolymer and the refractive index of the third copolymer may differ by 0.01 or less. In addition, no difference in the refractive index among the first to third copolymers is preferred.

The first copolymer may have a refractive index of 1.5 to 1.525 or 1.51 to 1.52, with the range of 1.51 to 1.52 being preferred. When the above-described range is satisfied, the first copolymer may work synergistically with second and third copolymers to be described below, and thus the transparency of the thermoplastic resin composition can be improved.

The shell of the first copolymer may have a weight-average molecular weight of 50,000 to 200,000 g/mol or 60,000 to 150,000 g/mol, with the range of 60,000 to 150,000 g/mol being preferred. When the above-described range is satisfied, flowability and impact resistance can be improved.

The first copolymer may be included at 5 to 40 wt % or 10 to 35 wt % with respect to the total weight of the thermoplastic resin composition, with the range of 10 to 35 wt % being preferred. When the above-described range is satisfied, the transparency of the thermoplastic resin composition can be improved.

The first copolymer may be prepared by emulsion polymerization or bulk polymerization of the first conjugated diene-based polymer with an alkyl (meth)acrylate-based monomer and an aromatic vinyl-based monomer, with the emulsion polymerization being preferred for the first copolymer to realize excellent transparency and excellent impact resistance.

A-2) Second Copolymer

The second copolymer is a graft copolymer and includes a second conjugated diene-based polymer, an alkyl (meth)acrylate-based monomer unit, and an aromatic vinyl-based monomer unit.

The second copolymer may impart excellent impact resistance and excellent transparency, particularly, significantly excellent impact resistance to the thermoplastic resin composition.

The second conjugated diene-based polymer may have an average particle diameter of 0.23 to 0.5 μm, preferably, 0.25 to 0.48 μm. Below the above-described range, excellent impact resistance may not be realized, and above the above-described range, excellent transparency may not be realized.

The second conjugated diene-based polymer may be included at 35 to 65 wt % or 40 to 60 wt % with respect to the total weight of the second copolymer, with the range of 40 to 60 wt % being preferred. When the above-described range is satisfied, the impact resistance and transparency of the second copolymer can be improved.

Other descriptions of the second conjugated diene-based polymer have been provided in the description of the first conjugated diene-based polymer.

The alkyl (meth)acrylate-based monomer unit may impart excellent transparency to the second copolymer.

The types of the alkyl (meth)acrylate-based monomer unit have been described above.

The alkyl (meth)acrylate-based monomer unit may be included at 20 to 50 wt % or 25 to 45 wt % with respect to the total weight of the second copolymer, with the range of 25 to 45 wt % being preferred. When the above-described range is satisfied, the transparency of the second copolymer can be improved.

The aromatic vinyl-based monomer unit may impart processability, stiffness, and mechanical properties to the second copolymer.

The types of the aromatic vinyl-based monomer unit have been described above.

The aromatic vinyl-based monomer unit may be included at 7 to 30 wt % or 10 to 25 wt % with respect to the total weight of the second copolymer, with the range of 10 to 25 wt % being preferred. When the above-described range is satisfied, the processability, stiffness, and mechanical properties of the second copolymer can be improved.

The second copolymer may further include a vinyl cyan-based monomer unit to improve chemical resistance.

The types of the vinyl cyan-based monomer unit have been described above.

The vinyl cyan-based monomer unit may be included at 0.5 to 10 wt % or 1 to 7 wt % with respect to the total weight of the second copolymer, with the range of 1 to 7 wt % being preferred. When the above-described range is satisfied, the chemical resistance of the second copolymer can be improved without the occurrence of a yellowing phenomenon. In addition, the formation of a coagulum is suppressed during the polymerization of the second copolymer, and thus polymerization stability can increase.

The second copolymer may have 35 to 70%, more preferably 38 to 60%, and most preferably 40 to 50%. When the above-described range is satisfied, the transparency of the thermoplastic resin composition can be improved. When a degree of grafting for the second copolymer is less than the above-described range, even though the refractive indices of the first to third copolymers are consistent, the transparency of the thermoplastic resin composition may be degraded. On the other hand, when a degree of grafting for the second copolymer is more than the above-described range, impact strength may be degraded.

Meanwhile, the transparency of the second copolymer may be determined by a difference in the refractive index between the second conjugated diene-based polymer and a shell including the alkyl (meth)acrylate-based monomer unit and the aromatic vinyl-based monomer unit as described in the description of the first copolymer. That is, in order for the second copolymer to have excellent transparency, the refractive index of the second conjugated diene-based polymer and the refractive index of the shell may differ by 0.01 or less, and no difference in the refractive index therebetween is preferred.

The second copolymer may have a refractive index of 1.5 to 1.525 or 1.51 to 1.52, with the range of 1.51 to 1.52 being preferred. When the above-described range is satisfied, the second copolymer may work synergistically with first and third copolymers, and thus the transparency of the thermoplastic resin composition can be improved.

The shell of the second copolymer may have a weight-average molecular weight of 50,000 to 200,000 g/mol or 70,000 to 150,000 g/mol, with the range of 70,000 to 150,000 g/mol being preferred. When the above-described range is satisfied, flowability and impact resistance can be improved.

The second copolymer may be included at 10 to 40 wt % or 13 to 35 wt % with respect to the total weight of the thermoplastic resin composition, with the range of 13 to 35 wt % being preferred. When the above-described range is satisfied, the impact resistance of the thermoplastic resin composition can be improved.

The second copolymer may be prepared by emulsion polymerization or bulk polymerization of the second conjugated diene-based polymer with an alkyl (meth)acrylate-based monomer and an aromatic vinyl-based monomer, with emulsion polymerization being preferred for the second copolymer to realize excellent impact resistance and excellent transparency.

B) Third Copolymer

The third copolymer is a matrix copolymer and includes an alkyl (meth)acrylate-based monomer unit and a vinyl cyan-based monomer unit.

The third copolymer may impart excellent transparency and excellent processability to the thermoplastic resin composition.

The third copolymer may include an alkyl (meth)acrylate-based monomer unit and an aromatic vinyl-based monomer unit in a weight ratio of 30:70 to 80:20 or 40:60 to 75:25, with the range of 40:60 to 75:25 being preferred. When the above-described range is satisfied, the transparency and processability of the thermoplastic resin composition can be improved.

The types of the alkyl (meth)acrylate-based monomer unit and the types of the aromatic vinyl-based monomer unit have been described above.

The third copolymer may further include a vinyl cyan-based monomer unit to improve chemical resistance.

The types of the vinyl cyan-based monomer unit have been described above.

When the third copolymer further includes the vinyl cyan-based monomer unit, the third copolymer may include, with respect to the total weight of the third copolymer, 60 to 80 wt % of the alkyl (meth)acrylate-based monomer unit; 15 to 35 wt % of the aromatic vinyl-based monomer unit; and 0.5 to 10 wt % of the vinyl cyan-based monomer unit, and preferably includes 65 to 75 wt % of the alkyl (meth)acrylate-based monomer unit; 20 to 30 wt % of the aromatic vinyl-based monomer unit; and 1 to 10 wt % of the vinyl cyan-based monomer unit. When the above-described range is satisfied, the chemical resistance of the third copolymer can be improved without the occurrence of a yellowing phenomenon.

The refractive index of the third copolymer and the refractive index of each of the first copolymer and the second copolymer may differ by 0.01 or less, and no difference in the refractive index therebetween is preferred.

The third copolymer may have a refractive index of 1.5 to 1.525 or 1.51 to 1.52, with the range of 1.5 to 1.52 being preferred. When the above-described range is satisfied, the third copolymer may work synergistically with first and second copolymers, and thus the transparency of the thermoplastic resin composition can be improved.

The third copolymer may have a weight-average molecular weight of 50,000 to 200,000 g/mol or 60,000 to 150,000 g/mol, with the range of 60,000 to 150,000 g/mol being preferred. When the above-described range is satisfied, flowability and impact resistance can be improved.

The third copolymer may be included at 20 to 75 wt % or 30 to 70 wt % with respect to the total weight of the thermoplastic resin composition, with the range of 30 to 70 wt % being preferred. When the above-described range is satisfied, the transparency and processability of the thermoplastic resin composition can be improved.

The third copolymer may be prepared by suspension polymerization or bulk polymerization of an alkyl (meth)acrylate-based monomer and an aromatic vinyl-based monomer, with bulk polymerization capable of preparing a high-purity copolymer and reducing costs, particularly, continuous bulk polymerization being preferred.

C) Plasticizer

The plasticizer may have a viscosity of 700 to 10,000 cP and impart excellent processability to the thermoplastic resin composition.

The plasticizer preferably has a viscosity of 1,000 to 90,000 cP, more preferably, 1,200 to 5,000 cP. Below the above-described range, the migration phenomenon of the plasticizer occurs in the thermoplastic resin composition. In addition, the generation of gas and mold deposits may occur during injection molding. Above the above-described range, the processability of the thermoplastic resin composition is degraded.

The plasticizer may be included at 0.3 to 5 wt %, preferably 0.5 to 4 wt %, and more preferably 1 to 4 wt % with respect to the total weight of the thermoplastic resin composition. When the above-described range is satisfied, the transparency and processability of the thermoplastic resin composition can be improved, and the migration phenomenon of the plasticizer can be prevented. When the plasticizer is included below the above-described range, the transparency and processability of the thermoplastic resin composition are degraded. When the plasticizer is included above the above-described range, the transparency and impact strength of the thermoplastic resin composition are degraded, and the migration phenomenon of the plasticizer also occurs.

The plasticizer may have a refractive index of 1.45 or more, 1.45 to 1.6, or 1.45 to 1.52, with the range of 1.45 to 1.52 being preferred. When the above-described condition is satisfied, the transparency of the prepared thermoplastic resin molded article can be improved.

The plasticizer may include an aliphatic dicarboxylic acid-based monomer unit and an aliphatic dihydroxy-based monomer unit.

The aliphatic dicarboxylic acid-based monomer unit may be a unit derived from one or more selected from the group consisting of adipic acid, succinic acid, and glutaric acid, with the unit derived from adipic acid being preferred.

The aliphatic dihydroxy-based monomer unit may be a unit derived from one or more selected from the group consisting of 1,2-butanediol, 1,3-butanediol, 1,4-butanediol, 1,2-ethanediol, 1,2-propanediol, 1,3-propanediol, 1,6-hexanediol, 1,4-hexanediol, and 2-2-dimethyl-1,3-propanediol, with the unit derived from one or more selected from the group consisting of 1,3-butanediol, 1,2-propanediol, and 2-2-dimethyl-1,3-propanediol being preferred.

The plasticizer may further include an aliphatic ester-based monomer unit and an acetate-based monomer unit. The aliphatic ester-based monomer unit may be a unit derived from one or more selected from the group consisting of 2-ethylhexyl ester, octyl ester, and isononyl ester, and the acetate-based monomer unit may be a unit derived from acetate.

The plasticizer may be one or more selected from the group consisting of: poly[di(2-ethylhexyl)glycoladipate] (CAS NO. 73018-26-5); 2,2'-methylenebis[6-(2H-benzotriazol-2-yl)-4-(1,1,3,3-tetramethylbutyl)phenol] (CAS NO. 103597-45-1); hexanedioic acid, polymer with 2,2-dimethyl-1,3-propanediol and 1,2-propanediol, isononyl ester (CAS NO. 208945-13-5); hexanedioic acid, polymer with 1,2-propanediol, n-octyl ester (CAS NO. 82904-80-1); and hexanedioic acid, polymer with 1,2-propanediol, acetate (CAS NO. 55799-38-7), with one or more selected from the group consisting of: poly[di(2-ethylhexyl)glycoladipate]; 2,2'-methylenebis[6-(2H-benzotriazol-2-yl)-4-(1,1,3,3-tetramethylbutyl)phenol]; and hexanedioic acid, polymer with 2,2-dimethyl-1,3-propanediol and 1,2-propanediol, isononyl ester being preferred.

The plasticizer may be one or more selected from the group consisting of SONGCIZER™ P-2600 (manufactured by Songwon Industrial Co., Ltd.), SONGCIZER™ P-3600 (manufactured by Songwon Industrial Co., Ltd.), Palamoll® 632 (manufactured by BASF Corporation), Palamoll® 638 (manufactured by BASF Corporation), Palamoll® 652 (manufactured by BASF Corporation), Admex™ 760 Polymeric Plasticizer (manufactured by EASTMAN), and EDENOL® 1225 (manufactured by Emery Olechemicals), which are commercially available materials, with one or more selected from the group consisting of SONGCIZER™ P-2600 (manufactured by Songwon Industrial Co., Ltd.), Palamoll® 638 (manufactured by BASF Corporation), Palamoll® 652 (manufactured by BASF Corporation), and EDENOL® 1225 (manufactured by Emery Olechemicals) being preferred.

Meanwhile, it is preferable that the plasticizer is not a phthalate-based plasticizer that causes environmental issues.

The thermoplastic resin composition according to an embodiment of the present invention may include, with respect to the total weight of the thermoplastic resin composition, 3 to 20 wt % of the first conjugated diene-based polymer; 3 to 20 wt % of the second conjugated diene-based polymer; 45 to 65 wt % of the alkyl (meth)acrylate-based monomer unit; 10 to 30 wt % of the aromatic vinyl-based monomer unit; and 0.3 to 5 wt % of the plasticizer, and preferably includes 5 to 15 wt % of the first conjugated diene-based polymer; 5 to 15 wt % of the second conjugated diene-based polymer; 50 to 65 wt % of the alkyl (meth)acrylate-based monomer unit; 15 to 25 wt % of the aromatic vinyl-based monomer unit; and 0.5 to 4 wt % of the plasticizer. When the above-described range is satisfied, the transparency, processability, and impact resistance of the thermoplastic resin composition can be improved.

When the thermoplastic resin composition according to an embodiment of the present invention further includes a vinyl cyan-based monomer unit, the vinyl cyan-based monomer unit may be included at 0.5 to 10 wt % or 1 to 7 wt % with respect to the total weight of the thermoplastic resin composition, with the range of 1 to 7 wt % being preferred. When the above-described range is satisfied, the chemical resistance of the thermoplastic resin composition is improved, and a yellowing phenomenon does not occur.

The thermoplastic resin composition according to an embodiment of the present invention may have a degree of grafting of 35 to 65% or 40 to 60%, with the range of 40 to 60% being preferred. When the above-described range is satisfied, the transparency of the thermoplastic resin composition can be improved.

The thermoplastic resin composition according to an embodiment of the present invention may have a melt flow index of 15 to 45 g/10 min or 18 to 30 g/10 min as measured at 220° C., with the range of 18 to 30 g/10 min being preferred. When the above-described range is satisfied, the processability of the thermoplastic resin composition can be improved.

2. Thermoplastic Resin Molded Article

A thermoplastic resin molded article according to another embodiment of the present invention is made of the thermoplastic resin composition according to an embodiment of the present invention and includes: an impact modifying part including a first conjugated diene-based polymer and a second conjugated diene-based polymer; and a matrix part including the alkyl (meth)acrylate-based monomer unit and the aromatic vinyl-based monomer unit, wherein the refractive index of the impact modifying part and the refractive index of the matrix part differ by 0.01 or less.

When the above-described condition is satisfied, the transparency of the thermoplastic resin molded article can be improved.

The thermoplastic resin molded article may have a haze value of 1.3 or less and an impact strength of 7 kg·cm/cm or more, and preferably has a haze value (transparency) of 1.2 or less and an impact strength of 9 kg·cm/cm or more. When the above-described condition is satisfied, the transparency and impact resistance of the thermoplastic resin molded article can be improved.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Preparation Example 1: Preparation of A-1-1

50 parts by weight of ion exchanged water, 8.8 parts by weight of methyl methacrylate, 3 parts by weight of styrene, 0.8 part by weight of acrylonitrile, 0.1 part by weight of divinylbenzene as a crosslinking agent, 0.2 part by weight of cumene hydroperoxide as an initiator, and 0.5 part by weight of sodium alkyl aryl sulfonate (sodium dodecylbenzenesulfonate) as an emulsifier were added to 50 parts by weight of polybutadiene latex (polymerization method: emulsion polymerization, gel content: 90%, average particle diameter: 0.12 μm), mixed for 5 hours, and then polymerized while continuously adding 26.2 parts by weight of methyl methacrylate, 9 parts by weight of styrene, 2.2 parts by weight of acrylonitrile, 0.5 part by weight of t-dodecyl mercaptan as a molecular weight controlling agent, 0.05 part by weight of ethylenediamine tetraacetate, 0.1 part by weight of sodium formaldehyde sulfoxylate, and 0.001 part by weight of ferrous sulfate as redox-based catalysts, and 0.1 part by weight of cumene hydroperoxide as an initiator at 70° C. and a predetermined rate for 5 hours. After the continuous addition was terminated, the temperature was raised to 80° C., aging was performed for an hour, and the polymerization was then terminated to obtain a graft copolymer latex. Subsequently, the graft copolymer latex was coagulated by adding 2 parts by weight of magnesium sulfate as a coagulant, dehydrated, and dried to obtain a graft copolymer powder. The graft copolymer powder thus obtained had a refractive index of 1.516 and a degree of grafting of 55%.

Preparation Example 2: Preparation of A-2-1

50 parts by weight of ion exchanged water, 8.8 parts by weight of methyl methacrylate, 3 parts by weight of styrene, 0.8 part by weight of acrylonitrile, 0.1 part by weight of divinylbenzene as a crosslinking agent, 0.2 part by weight of cumene hydroperoxide as an initiator, and 0.5 part by weight of sodium alkyl aryl sulfonate (sodium dodecylbenzenesulfonate) as an emulsifier were added to 50 parts by weight of polybutadiene latex (polymerization method: emulsion polymerization, gel content: 70%, average particle diameter: 0.3 μm), mixed for 3 hours, and then polymerized while continuously adding 26.2 parts by weight of methyl methacrylate, 9 parts by weight of styrene, 2.2 parts by weight of acrylonitrile, 0.5 part by weight of t-dodecyl mercaptan as a molecular weight controlling agent, 0.05 part by weight of ethylenediamine tetraacetate, 0.1 part by weight of sodium formaldehyde sulfoxylate, and 0.001 part by weight of ferrous sulfate as redox-based catalysts, and 0.1 part by weight of cumene hydroperoxide as an initiator at 70° C. and a predetermined rate for 5 hours. After the continuous addition was terminated, the temperature was raised to 80° C., aging was performed for an hour, and the polymerization was then terminated to obtain a graft copolymer latex. Subsequently, the graft copolymer latex was coagulated by adding 2 parts by weight of magnesium sulfate as a coagulant, dehydrated, and dried to obtain a graft copolymer powder. The graft copolymer powder thus obtained had a refractive index of 1.516 and a degree of grafting of 45%.

Preparation Example 3: Preparation of A-2-2

50 parts by weight of ion exchanged water, 7.5 parts by weight of methyl methacrylate, 4.8 parts by weight of styrene, 0.8 part by weight of acrylonitrile, 0.1 part by weight of divinylbenzene as a crosslinking agent, 0.2 part by weight of cumene hydroperoxide as an initiator, and 0.5 part by weight of sodium alkyl aryl sulfonate (sodium dodecylbenzenesulfonate) as an emulsifier were added to 50 parts by weight of polybutadiene latex (polymerization method: emulsion polymerization, gel content: 70%, average particle diameter: 0.3 μm), mixed for 3 hours, and then polymerized while continuously adding 22.3 parts by weight of methyl methacrylate, 14.4 parts by weight of styrene, 2.2 parts by weight of acrylonitrile, 0.5 part by weight of t-dodecyl mercaptan as a molecular weight controlling agent, 0.05 part by weight of ethylenediamine tetraacetate, 0.1 part by weight of sodium formaldehyde sulfoxylate, and 0.001 part by weight of ferrous sulfate as redox-based catalysts, and 0.1 part by weight of cumene hydroperoxide as an initiator at 70° C. and a predetermined rate for 5 hours. After the continuous addition was terminated, the temperature was raised to 80° C., aging was performed for an hour, and the polymerization was then terminated to obtain a graft copolymer latex. Subsequently, the graft copolymer latex was coagulated by adding 2 parts by weight of magnesium sulfate as a coagulant, dehydrated, and dried to obtain a graft copolymer powder. The graft copolymer powder thus obtained had a refractive index of 1.53 and a degree of grafting of 47%.

Preparation Example 4: Preparation of B-1

A raw material was prepared by mixing 70.4 parts by weight of methyl methacrylate, 24.6 parts by weight of styrene, and 5 parts by weight of acrylonitrile with 30 parts by weight of toluene as a solvent and 0.15 part by weight of t-dodecyl mercaptan as a molecular weight controlling agent and then continuously added to a reactor for an average reaction time of 3 hours, and the reaction temperature was kept at 148° C. A polymerization solution produced in the reactor was heated in a preheating bath, unreacted monomers were volatilized in a volatilization tank, and the polymer was extruded using a polymer transfer pump extruder while maintaining the temperature of the polymer at 210° C. to obtain a pellet-type MSAN copolymer. The MSAN copolymer thus obtained had a refractive index of 1.516.

EXAMPLES AND COMPARATIVE EXAMPLES

A graft copolymer, a matrix copolymer, and a plasticizer were mixed in contents shown in the following Tables 1 to 3 to prepare a thermoplastic resin composition.

Experimental Example 1

100 parts by weight of each of the thermoplastic resin compositions of Examples and Comparative Examples and 0.3 part by weight of an antioxidant (Irganox® 1010 manufactured by BASF Corporation) were uniformly mixed and then put into a twin-screw extruder kneader at a cylinder temperature of 220° C. to prepare a pellet. A physical property of the pellet was measured by the method described below, and results thereof are shown in the following Tables 1 to 3.

(1) Melt flow index (g/10 min): measured in accordance with ASTM 1238 at 220° C. and 10 kg.

Experimental Example 2

The pellets prepared in Experimental Example 1 were injection-molded to prepare specimens. Physical properties of the specimens were measured by the methods described below, and results thereof are shown in the following Tables 1 to 3.

(2) Haze value (%): determined by measuring transparency in accordance with ASTM 1003.

(3) Impact strength (Notched IZOD impact strength, ¼ inch, kg·cm/cm): measured at 23° C. in accordance with ASTM 245 D256.

(4) Migration: evaluated by placing the specimen on oil paper in a 70° C. oven, applying a weight of 10 kg onto the specimen, storing them for a week, and then observing the change of the oil paper. When migrated, the plasticizer wets the oil paper to discolor the oil paper, and thus the discoloration means that the oil paper was stained with the plasticizer due to the migration of the plasticizer. Therefore, no discoloration was indicated as "OK", and discoloration was indicated as "NG".

TABLE 1

| Classification | | Comparative Example 1 | Examples | | | | | Comparative Examples | |
|---|---|---|---|---|---|---|---|---|---|
| | | | 1 | 2 | 3 | 4 | 5 | 2 | 3 |
| Graft copolymer (wt %) | A-1-1 | 15 | 15 | 15 | 15 | 15 | 15 | 15 | 15 |
| | A-2-1 | 20 | 20 | 20 | 20 | 20 | 20 | 20 | 20 |
| Matrix copolymer (wt %) | B-1 | 65 | 64.7 | 64.5 | 63 | 62 | 61 | 59 | 55 |
| Plasticizer (wt %) | C-1 | — | 0.3 | 0.5 | 2 | 3 | 4 | 6 | 10 |
| Melt flow index | | 14.3 | 18.1 | 18.9 | 22.0 | 23.1 | 24.2 | 27.8 | 43.7 |
| Haze value | | 1.6 | 1.1 | 1.1 | 0.9 | 1.0 | 1.0 | 2.2 | 2.9 |
| Impact strength | | 10.1 | 9.8 | 10.1 | 9.8 | 10.2 | 10.1 | 8.7 | 7.8 |
| Migration | | — | OK | OK | OK | OK | OK | NG | NG |

A-1-1: Graft copolymer (average particle diameter of polybutadiene: 0.12 μm, refractive index: 1.516, degree of grafting: 55%)
A-2-1: Graft copolymer (average particle diameter of polybutadiene: 0.3 μm, refractive index: 1.516, degree of grafting: 45%)
B-1: Matrix copolymer (refractive index: 1.516)
C-1: SONGCIZER ™ P-2600 (manufactured by Songwon Industrial Co., Ltd., viscosity: 2,200 cP, refractive index: 1.466, Chemical Name: poly[di(2-ethylhexyl)glycoladipate])

TABLE 2

| Classification | | Examples | | | | |
|---|---|---|---|---|---|---|
| | | 6 | 7 | 8 | 9 | 10 |
| Graft copolymer (wt %) | A-1-1 | 18 | 15 | 15 | 27 | 20 |
| | A-2-1 | 22 | 20 | 20 | 15 | 15 |
| Matrix copolymer (wt %) | B-1 | 57 | 63 | 63 | 55 | 62 |
| Plasticizer (wt %) | C-1 | 3 | — | — | — | — |
| | C-2 | — | 2 | — | — | — |
| | C-3 | — | — | 2 | 3 | — |
| | C-4 | — | — | — | — | 3 |
| Melt flow index | | 19.8 | 20.5 | 21.4 | 18.2 | 19.2 |
| Haze value | | 1.0 | 1.1 | 1.0 | 1.0 | 1.1 |
| Impact strength | | 12.2 | 10.3 | 9.7 | 10.5 | 8.5 |
| Migration | | OK | OK | OK | OK | OK |

A-1-1: Graft polymer (average particle diameter of polybutadiene: 0.12 μm, refractive index: 1.516, degree of grafting: 55%)
A-2-1: Graft polymer (average particle diameter of polybutadiene: 0.3 μm, refractive index: 1.516, degree of grafting: 45%)
B-1: Matrix copolymer (refractive index: 1.516)
C-1: SONGCIZER ™ P-2600 (manufactured by Songwon Industrial Co., Ltd., viscosity: 2,200 cP, refractive index: 1.466, Chemical Name: poly[di(2-ethylhexyl)glycoladipate])
C-2: Palamoll ® 652 (manufactured by BASF Corporation, viscosity: 2,000 cP, refractive index: 1.465, Chemical Name: hexanedioic acid, polymer with 2,2-dimethyl-1,3-propanediol and 1,2-propanediol isononyl ester, CAS NO. 208945-13-5)
C-3: EDENOL ® 1225 (manufactured by Emery Olechemicals, viscosity: 1,200 cP, refractive index: 1.463)
C-4: Palamoll ® 638 (manufactured by BASF Corporation, viscosity: 8,000 cP, refractive index: 1.468, Chemical Name: hexanedioic acid, polymer with 1,2-propanediol, n-octyl ester, CAS NO. 82904-80-1)

TABLE 3

| Classification | | Comparative Examples | | | | |
|---|---|---|---|---|---|---|
| | | 4 | 5 | 6 | 7 | 8 |
| Graft copolymer (wt %) | A-1-1 | 18 | 15 | 18 | 35 | 18 |
| | A-2-1 | 22 | 20 | 20 | — | — |
| | A-2-2 | — | — | — | — | 22 |
| Matrix copolymer (wt %) | B-1 | 56 | 63 | 62 | 63 | 60 |
| Plasticizer (wt %) | C-1 | — | — | — | 2 | — |
| | C-5 | 4 | — | — | — | — |
| | C-6 | — | 2 | — | — | — |
| Melt flow index | | 25.9 | 31.2 | 13.8 | 22.1 | 11.3 |
| Haze value | | 1.6 | 1.7 | 1.0 | 0.6 | 1.4 |

TABLE 3-continued

| | Comparative Examples | | | | |
|---|---|---|---|---|---|
| Classification | 4 | 5 | 6 | 7 | 8 |
| Impact strength | 9.4 | 8.5 | 12.9 | 2.8 | 11.2 |
| Migration | OK | NG | — | OK | — |

A-1-1: Graft copolymer (average particle diameter of polybutadiene: 0.12 μm, refractive index: 1.516, degree of grafting: 55%)
A-2-1: Graft copolymer (average particle diameter of polybutadiene: 0.3 μm, refractive index: 1.516, degree of grafting: 45%)
A-2-2: Graft copolymer (average particle diameter of polybutadiene: 0.3 μm, refractive index: 1.53, degree of grafting: 47%)
B-1: Matrix copolymer (refractive index: 1.516)
C-1: SONGCIZER ™ P-2600 (manufactured by Songwon Industrial Co., Ltd., viscosity: 2,200 cP, refractive index: 1.466, Chemical Name: poly[di(2-ethylhexyl)glycoladipate])
C-5: GL-500 (manufactured by LG Chem Ltd., refractive index: 1.41, viscosity: 60 cP, Chemical Name: reaction product of disubstitutedcarbomonocycle, alkyl (C = 1~3) and alkanol (C = 4~6) and alkanol (C = 3~5))
C-6: SONGCIZER ™ P-1500 (manufactured by Songwon Industrial Co., Ltd., viscosity: 150 cP, refractive index: 1.456, Chemical Name: poly[di(2-ethylhexyl)glycoladipate])

It can be seen that Examples 1 to 5 including a plasticizer having a viscosity of 2,200 cP at 0.3 to 4 wt % exhibited high melt flow indices and low haze values, and processability and transparency were thus improved. In addition, it can be seen that as the content of a plasticizer was increased, a melt flow index was increased, and processability was thus improved. Meanwhile, it can be seen that Comparative Example 1 not including a plasticizer exhibited a low melt flow index and a high haze value compared to Examples 1 to 5, and processability and transparency were thus degraded. It can be seen that Comparative Examples 2 and 3 including a plasticizer having a viscosity of 2,200 cP at 6 wt % and 10 wt %, respectively, exhibited an excessively high melt flow index, an excessively high haze value, low impact strength, and degraded migration. From these results, it can be seen that even if a plasticizer having a viscosity of 2,200 cP was used in an excessive amount, processability, transparency, impact resistance, and migration were rather degraded.

Referring to Examples 4 and 6, it can be seen that as the content of a graft copolymer was increased, impact strength was improved, and processability was slightly degraded because the content of a matrix copolymer was relatively decreased.

It can be seen that Examples 6 to 10 including plasticizers having a viscosity of 2,200 cP, 2,000 cP, 1,200 cP, 1,200 cP, and 8,000 cP, respectively, realized an excellent melt flow index, an excellent haze value, excellent impact strength, and excellent migration.

Meanwhile, it can be seen that Comparative Example 4 including a plasticizer having a viscosity of 60 cP and Comparative Example 5 including a plasticizer having a viscosity of 150 cP exhibited a high haze value, and transparency was thus degraded.

It can be seen that Comparative Example 6 exhibited a low haze value by including an excessive amount of a graft copolymer including polybutadiene having an average particle diameter of 0.12 μm compared to Comparative Example 1, and excellent transparency was thus realized. However, Comparative Example 6 exhibited a low melt flow index by not including a plasticizer, and thus processability was significantly degraded.

It can be seen that Comparative Example 7 including a plasticizer having a viscosity of 2,200 cP and not including a graft copolymer including polybutadiene having an average particle diameter of 0.3 μm exhibited significantly degraded impact strength.

Comparative Example 8 not including a plasticizer and including a graft copolymer having a refractive index of 1.53 and including polybutadiene having an average particle diameter of 0.3 μm exhibited a low haze value by including an excessive amount of a graft copolymer including polybutadiene having an average particle diameter of 0.12 μm compared to Comparative Example 1, but it was difficult to realize excellent transparency. In addition, Comparative Example 8 exhibited a low melt flow index by not including a plasticizer, and thus processability was significantly degraded.

The invention claimed is:

1. A thermoplastic resin composition comprising:
   A-1) a first copolymer including a first conjugated diene-based polymer, an alkyl (meth)acrylate-based monomer unit, and an aromatic vinyl-based monomer unit, wherein the first conjugated diene-based polymer has an average particle diameter of 0.05 to 0.2 μm;
   A-2) a second copolymer including a second conjugated diene-based polymer, an alkyl (meth)acrylate-based monomer unit, and an aromatic vinyl-based monomer unit, wherein the second conjugated diene-based polymer has an average particle diameter of 0.23 to 0.5 μm;
   B) a third copolymer including an alkyl (meth)acrylate-based monomer unit and an aromatic vinyl-based monomer unit; and
   C) a plasticizer having a viscosity of 700 to 10,000 cP, wherein the plasticizer is included at 0.3 to 5 wt %.

2. The thermoplastic resin composition of claim 1, wherein C) the plasticizer has a refractive index of 1.45 or more.

3. The thermoplastic resin composition of claim 1, wherein C) the plasticizer includes an aliphatic dicarboxylic acid-based monomer unit and an aliphatic dihydroxy-based monomer unit.

4. The thermoplastic resin composition of claim 3, wherein C) the plasticizer further includes one or more selected from the group consisting of an aliphatic ester-based monomer unit and an acetate-based monomer unit.

5. The thermoplastic resin composition of claim 1, wherein A-1) the first copolymer has a degree of grafting of 40 to 80%.

6. The thermoplastic resin composition of claim 1, wherein A-2) the second copolymer has a degree of grafting of 35 to 70%.

7. The thermoplastic resin composition of claim 1, wherein the refractive indices of the first to third copolymers differ by 0.01 or less.

8. The thermoplastic resin composition of claim 1, wherein the first to third copolymers further includes a vinyl cyan-based monomer unit.

9. The thermoplastic resin composition of claim 1, which includes:
   A-1) the first copolymer at 5 to 40 wt %;
   A-2) the second copolymer at 10 to 40 wt %;
   B) the third copolymer at 20 to 75 wt %; and
   C) the plasticizer at 0.3 to 5 wt %.

10. The thermoplastic resin composition of claim 1, which includes:
   the first conjugated diene-based polymer at 3 to 20 wt %;
   the second conjugated diene-based polymer at 3 to 20 wt %;
   the alkyl (meth)acrylate-based monomer unit at 45 to 65 wt %;
   the aromatic vinyl-based monomer unit at 10 to 30 wt %; and
   the plasticizer at 0.3 to 5 wt %.

11. The thermoplastic resin composition of claim 1, which has a degree of grafting of 35 to 65%.

12. The thermoplastic resin composition of claim 1, which has a melt flow index of 15 to 45 g/10 min, as measured at 220° C.

13. A thermoplastic resin molded article made of the thermoplastic resin composition of claim 1 and comprising an impact modifying part and a matrix part,
- wherein the impact modifying part includes one or more selected from the group consisting of a first conjugated diene-based polymer and a second conjugated diene-based polymer,
- the matrix part includes an alkyl (meth)acrylate-based monomer unit and an aromatic vinyl-based monomer unit, and
- the refractive index of the impact modifying part and the refractive index of the matrix part differ by 0.01 or less.

14. The thermoplastic resin molded article of claim 13, which has a haze value of 1.3 or less and an impact strength of 7 kg·cm/cm or more.

* * * * *